Figure 1:
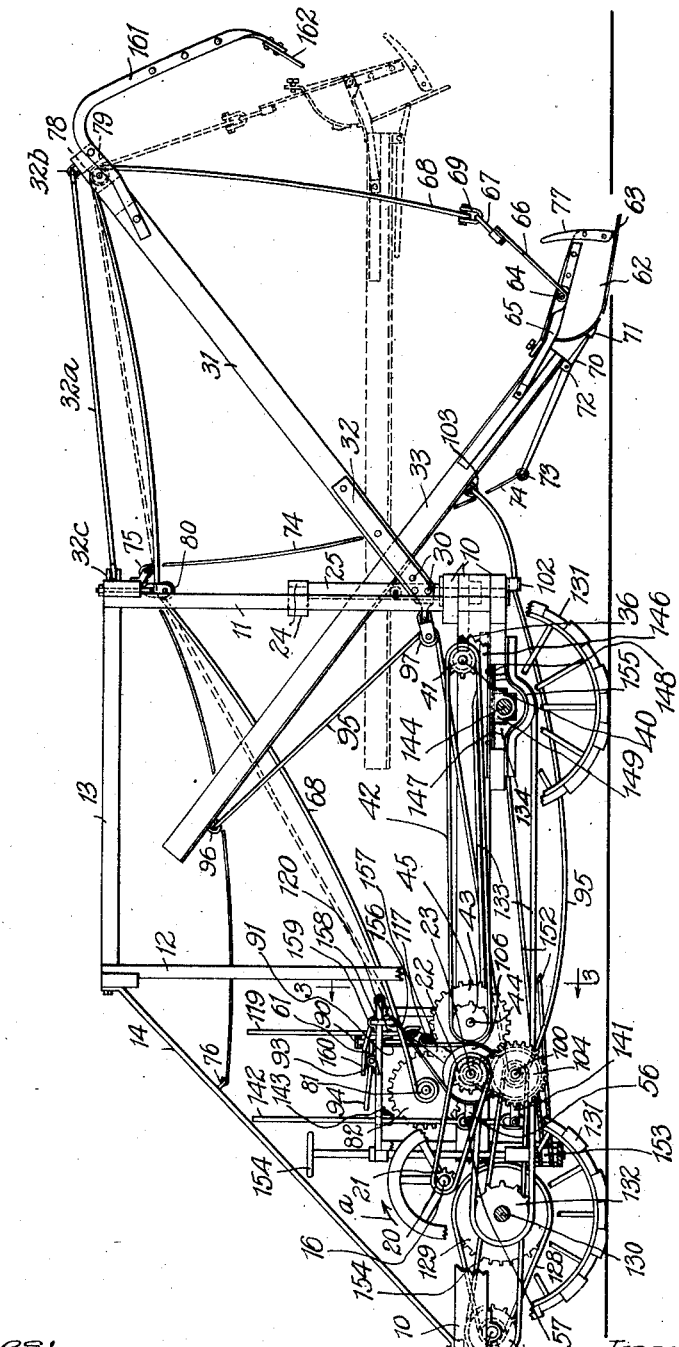

O. W. SIEBENHAAR.
EXCAVATING MACHINE.
APPLICATION FILED NOV. 8, 1909.

998,308.

Patented July 18, 1911.
5 SHEETS—SHEET 1.

Witnesses:
Leonard W. Novander
Frank J. Thelen

Inventor
Otto W. Siebenhaar
By Brown Williams
Attorneys

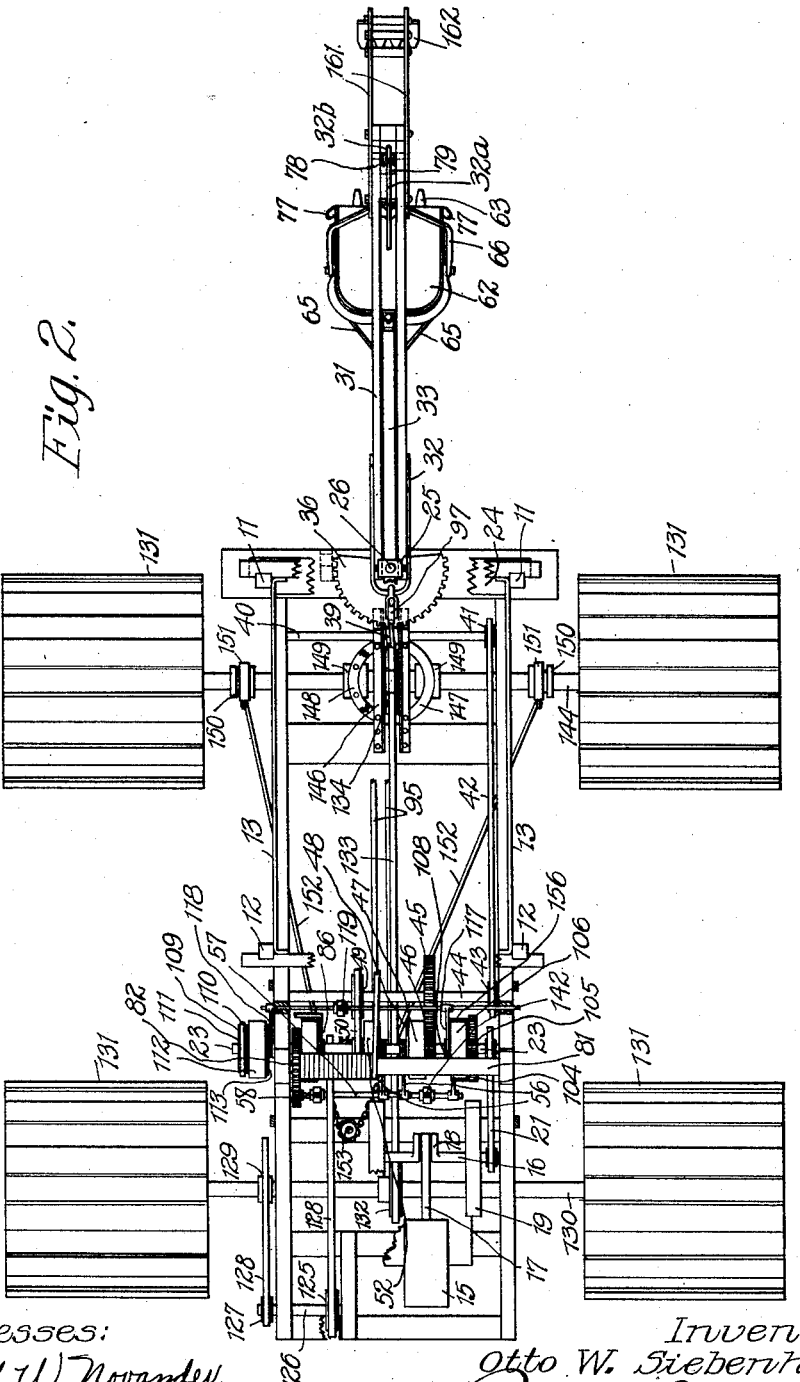

O. W. SIEBENHAAR.
EXCAVATING MACHINE.
APPLICATION FILED NOV. 8, 1909.
998,308.
Patented July 18, 1911.
5 SHEETS—SHEET 3.
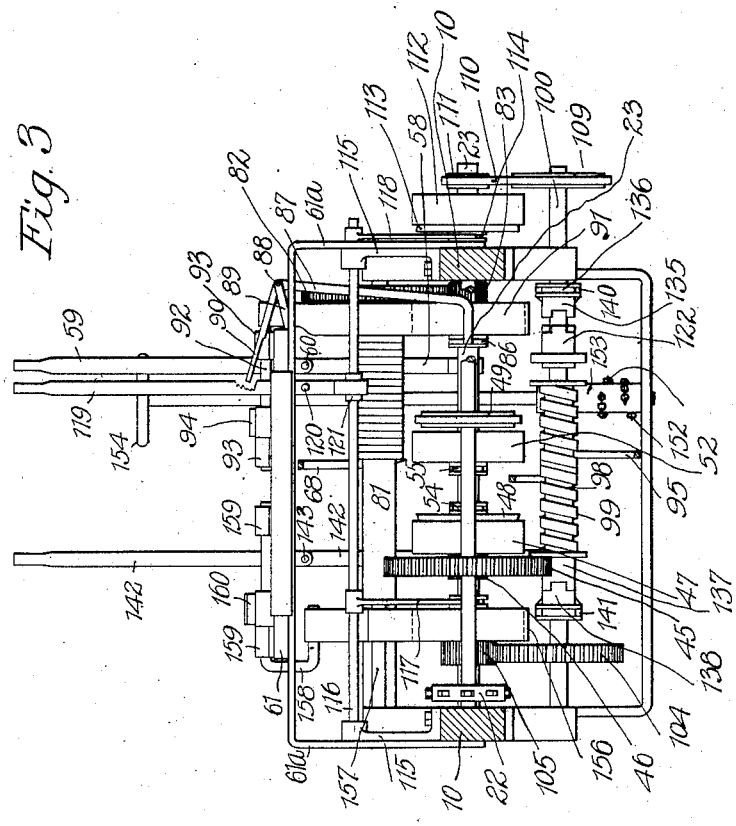

O. W. SIEBENHAAR.
EXCAVATING MACHINE.
APPLICATION FILED NOV. 8, 1909.
998,308.
Patented July 18, 1911.
5 SHEETS—SHEET 4.
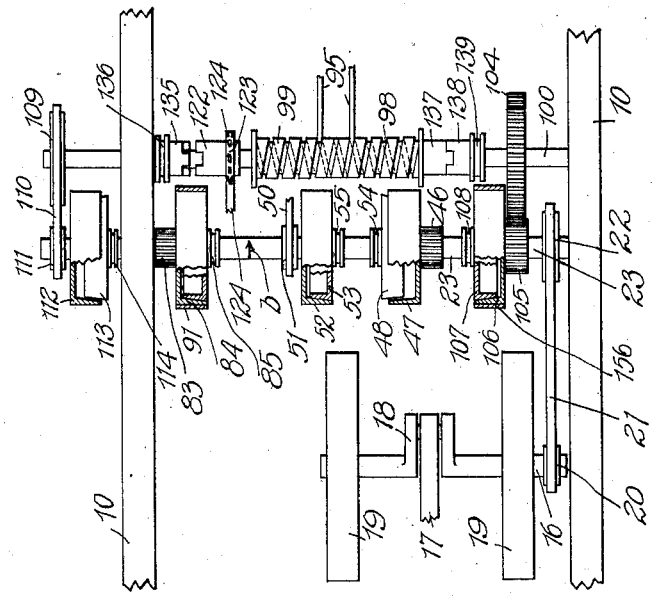
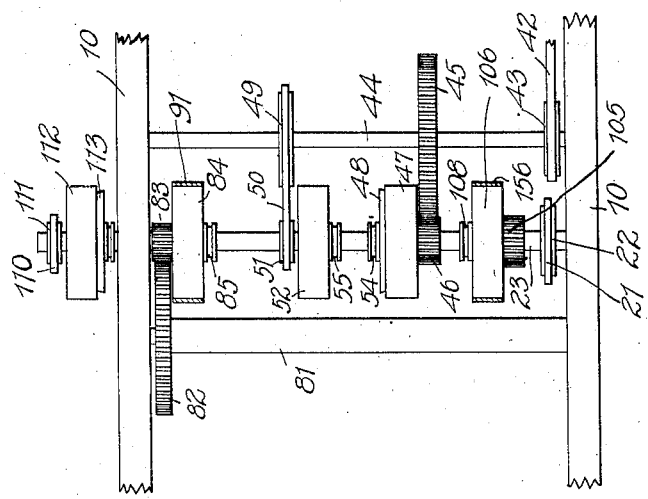
Witnesses:
Inventor
Otto W. Siebenhaar
By
Attorneys

O. W. SIEBENHAAR.
EXCAVATING MACHINE.
APPLICATION FILED NOV. 8, 1909.

998,308.

Patented July 18, 1911.
5 SHEETS—SHEET 5.

Witnesses:

Inventor
Otto W. Siebenhaar
By
Attorneys

UNITED STATES PATENT OFFICE.

OTTO W. SIEBENHAAR, OF FOND DU LAC, WISCONSIN, ASSIGNOR OF ONE-HALF TO B. F. & H. L. SWEET COMPANY, OF FOND DU LAC, WISCONSIN, A CORPORATION OF WISCONSIN.

EXCAVATING-MACHINE.

998,308.     Specification of Letters Patent.     Patented July 18, 1911.

Application filed November 8, 1909. Serial No. 526,699.

*To all whom it may concern:*

Be it known that I, OTTO W. SIEBENHAAR, a citizen of the United States, residing at Fond du Lac, in the county of Fond du Lac and State of Wisconsin, have invented a certain new and useful Improvement in Excavating-Machines, of which the following is a full, clear, concise, and exact description, reference being had to the accompanying drawings, forming a part of this specification.

My invention relates to excavating machinery.

The machine of my invention is an effective departure from the prior art, and is contemplated to effectually utilize all the expended energy in gaining the desired end. The entire mechanism employed goes toward the proper manipulation of a shovel, spade or scoop, and the various combined devices are designed to secure operation of this ultimate device in such a manner that each load of the excavated material may be encountered and transferred with the expenditure of a minimum amount of energy and with little, if any, waste.

In digging by hand the action is in the way of spading, that is, actually cutting a portion of the earth away and then carrying off that particular load so determined.

It is the object of my invention to provide an improved structure which is operative to secure manipulation of a shovel in a manner quite akin to manual manipulation, and thus, the action may be broadly divided into two parts,—a thrust into the earth and a transferring action whereby the load thus encountered is carried away.

The excavating machinery of my invention is designed to be mounted on a vehicle, and is particularly adapted for ditch digging, arrangements being made for properly propelling the vehicle by way of the same motive power which operates the digging mechanism proper. Provision is made for steering the vehicle sufficiently to maintain it in line in the use thus particularly referred to, and the embodiment of my invention herein particularly illustrated will be seen to be directed quite specifically to this use.

The most difficult operations proposed for excavating machinery are those of ditching marsh lands, and not only is the mode of operation of the shovel of my device particularly adapted to this use, but other features of my invention will be seen to be immediately applicable in such a process.

The shovel of my device has three distinct motions in the course of its operation: first, its thrusting motion, whereby it is forced into the ground to cut away a load; second, a raising motion to lift the load from the ditch; and third, a swinging motion to the side, whereby the load may be transferred to the earth works resulting along the sides of the ditch. Each of these actions are constrained motions either by mechanical connection or by gravity, as will hereinafter appear more clearly, and all result, in the preferred embodiment which I describe, from a single source of motive power.

My invention is embodied in the structure illustrated in the accompanying drawings, in which—

Figure 7:
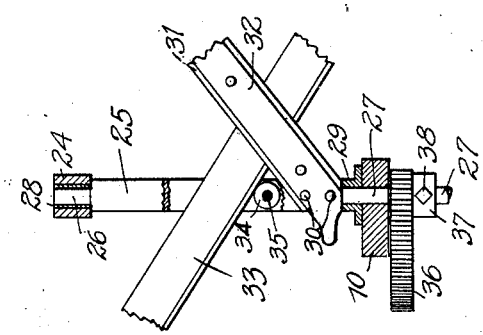
Figure 6:
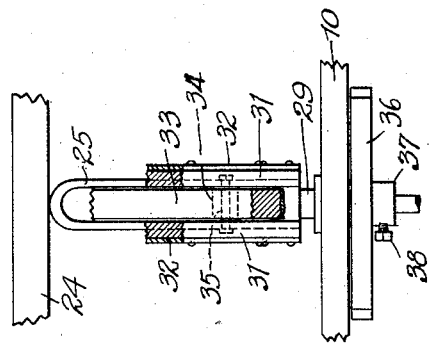
Figure 8:
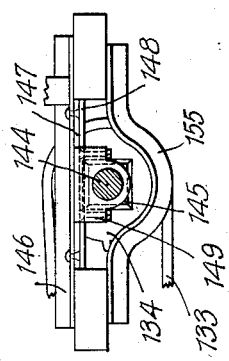

Figure 1 is a side elevational view thereof, parts being broken away to more clearly set forth the detail construction; Fig. 2 is a plan view, parts being broken away and shown in section to disclose the details; Fig. 3 is a partial sectional view on the line 3, 3 of Fig. 1; Fig. 4 is a developed view showing shaft connections which will be hereinafter described; Fig. 5 is a developed view showing other shaft connections which will be hereinafter described; Fig. 6 is an end elevation of a detail showing the means provided for the swinging and raising of the shovel, parts being shown in section; Fig. 7 is a side elevation of the detail referred to in Fig. 6, parts being shown in section to illustrate the construction more clearly; and Fig. 8 is a detail view, in side elevation, showing part of the mechanism having to do with the propulsion and steering of the vehicle.

Like reference characters are applied to the same parts throughout the various figures.

The main supporting frame of the device is supported primarily from a base in the form of a horizontal frame 10, which, as will be hereinafter described, is mounted upon wheels to provide for locomotion. At the front of this horizontal frame the uprights 11, 11 are provided. Midway between the front and rear thereof the uprights 12, 12 are secured in any suitable manner. The tops of these uprights are connected together by means of cross-bars 13, 13, and guy bars 14, 14 are bolted to the rectangular prismatic frame thus formed and to the horizontal frame, as clearly shown in Fig 1.

At 15 I have indicated an engine mounted in the frame-work, and at 16 the operating shaft thereof, connection between the cylinder of the engine and the shaft being secured by way of the connecting rod 17 and the crank 18. The fly-wheels are shown at 19, 19. The engine shaft 16 is provided at the end thereof with a sprocket wheel 20, which is connected by means of a link belt 21 with a sprocket wheel 22, keyed on a shaft 23 mounted in the framework, with which shaft the various actuating devices are operatively connected.

At the front of the rectangular supporting framework to which I have previously referred a cross-bar 24 is provided approximately midway between the top and bottom of the uprights 11, 11, to which it is secured in any suitable manner. Between this cross-piece 24 and the horizontal frame 10 and approximately midway between the uprights 11, 11 a yoke member 25 is provided, this yoke member having the upper pivot shaft 26 and the lower pivot shaft 27 extending therefrom at opposite ends in axial alinement and suitably mounted in the cross-piece 24 and the frame 10, respectively. Thus the yoke may be rotated on the pivot thus provided, a bushing 28 being provided in the opening in the cross-piece 24 for obvious purposes. A spacing and supporting member 29 is provided upon the frame 10 about the pivot shaft 27 and the yoke member 25 is thus pivotally secured in the framework.

Secured to the bottom of the yoke member 25 by means of bolts 30, 30, and extending upwardly and downwardly therefrom, is a swinging beam 31, reinforcing plates 32 being employed at the base thereof, as clearly shown in Figs. 1 and 7, for obvious purposes. A guide rod 32$^a$ connects with an eye 32$^b$ on the beam 31 and with a suitable eye 32$^c$ on the framework, as clearly shown in Fig. 1, for supporting purposes. The swinging beam 31 is provided with a transverse opening near its connection with the yoke member with which it swings, and through this opening and through the yoke 25 a thrust beam 33 extends, as shown clearly in Figs. 1, 2, 6 and 7. In the yoke 25 this thrust beam rests upon a roller 34 mounted upon a small shaft 35 extending transversely across the yoke 25, this thrust beam being adapted to rest upon this roller and to roll thereon, as will be hereinafter more fully set forth. The pivot shaft 27, which extends downwardly from the yoke member 25 extends below the frame member 10 and is there provided with a gear sector 36 keyed to the shaft in any suitable manner and held in place by means of a locking sleeve 37, which is provided with the set nut 38. Meshing with this gear sector 36 is a worm wheel 39, which is securely mounted upon a shaft 40 journaled in the side members of the horizontal frame 10, as clearly indicated in Fig. 2. This shaft 40 has keyed thereon near one end thereof a sprocket wheel 41, which is connected by means of a link belt 42 with a sprocket wheel 43 keyed near one end of a shaft 44. This shaft is provided with a gear 45, which meshes with a pinion 46 loosely mounted on the jack shaft 23. This arrangement is shown in Figs. 1, 2 and 3, and also very clearly in Fig. 5, which is a developed view and shows these shafts as if they were disposed in the same plane. The pinion 46 has secured thereto one element 47 of a clutch, the other element 48 of which rotates with the jack shaft 23 through the medium of a feather. This arrangement provides for moving the element 48 toward the element 47 so as to operatively connect the shaft 23 and the pinion 46. Also securely mounted upon the shaft 44 is a sprocket wheel 49, which is connected by means of a link belt 50 with a sprocket wheel 51 loosely mounted upon the shaft 23. This sprocket wheel 51 is secured to one element 52 of a clutch, the other element 53 thereof being feathered to the shaft 23 to insure its rotation therewith, but to provide for longitudinal movement relative thereto. The members 53 and 48 of the two clutches are provided with the grooved collars 54 and 55, respectively, in the grooves of which the bifurcated members 56, 56 engage. These bifurcated members are both secured to a laterally sliding rod 57, which is provided with the upwardly extending part 58, which terminates in an actuating lever 59, this lever being pivoted at 60 to a platform 61 suitably supported from the main frame 10 by way of braces 61$^a$. The driver and operator of this machine stands upon this platform, where he is within easy reach of the various levers for controlling the different mechanisms. It will be seen that the actuating lever 59 extends upwardly beyond this platform and would be of ready access by the operator. By actuating the lever 59 the rod 57 may be shifted to throw either one of the clutches 48 or 53 into active operation. The lever in a midway position maintains the clutching mechanism so that neither clutch is operative, and the shaft 44 remains at rest. It is thus apparent that the lever 59 may be brought into operation to operate the shaft 54 either in one direction or the other and by way of the link belt 42, shaft 40, worm wheel 39, and sector 36 to swing the yoke 25 and consequently the beam 31 to either one side or the other.

The beam 33 is provided at its end with a shovel 62, of which the essential element is the spading blade 63. This shovel is pivoted at 64 to the forwardly extending bars 65 secured to the end of the thrust beam 33, and upon the pivot points 64 a yoke 66 is also movably mounted. This yoke is provided with the eye 67, which connects with a lifting cable 68 by way of a connecting piece 69. The shovel 62 is normally held in secure relation with the thrust beam 33 by way of engagement with one end of a trip lever 70 with a lug 71 on the bottom of the shovel. This lever 70 is pivoted to the thrust beam 33 at 72, and the power end of this lever is provided with a ring 73, which connects with a trip cord 74 passing over a pulley 75 in the main framework and extending to the rear of the framework, being secured at 76 within easy reach of an operator standing upon the platform 61. The shovel 62 may be provided, if desired, with the auxiliary cutting blades 77. The operation of the tripping mechanism will be described later. The lifting cable 68 passes over a sheave 78 in an opening 79 near the end of the swinging beam 31, then passes over a pulley 80 suitably hinged in the main framework to keep the cable free from the operating mechanism and then passes to and is wound upon a drum shaft 81, to which the end of the cable is securely fastened. This drum shaft is, like the jack shaft, mounted in any suitable manner in the framework. The drum shaft 81 is provided with a gear wheel 82, which meshes with a pinion 83 loosely mounted upon the jack shaft 23. This arrangement is clearly shown in Fig. 5, the developed view, and also in Figs. 1, 2 and 3. The pinion 83 has secured thereto one member of a clutch 84, the other member being feathered upon the jack shaft 23 to provide for its rotation therewith and to permit its longitudinal movement relative thereto. The constantly revolving member of the clutch 84 is provided with the usual grooved collar 85, in which engages the bifurcated end 86 of an actuating lever 87, suitably pivoted at 88 on an extension 89 from the platform 61. The actuating lever 87 terminates in a foot-piece 90, which extends above the platform 61 and is within easy reach of an operator standing on the platform. The clutch 84 forms the drum for coaction with a brake-band 91, which engages with a bell crank lever 92 suitably pivoted in a bearing 93 on the platform, and which terminates in a foot-piece 94 within reach of the operator. By depressing the foot-piece 90 the clutch is thrown into operative position and the drum 81 is rotated in the proper direction to wind the lifting cable 68. To lower the beam 33 the clutch 84 is opened and the beam may drop of its own weight. This lowering of the beam is controlled by the brake-band and may be stopped at any point or merely retarded, as desired.

The thrust of the beam 33 is secured by way of a cable, a part of which is wound in a spiral groove in an operating drum. This cable I have shown at 95 and is secured near one end of the thrust beam 33 to an eye bolt 96, from where it passes to a pulley 97 mounted on the yoke 25, and from this pulley passes to the spiral groove 98 in a drum 99 loosely mounted upon a counter-shaft 100. After two or three turns upon this drum the thrusting cable 95 again passes to the front of the machine through a guide 102 and then through an eye bolt 103, which provides for its connection near the opposite end of the thrust beam 33. One end of the countershaft which I have just referred to has keyed thereon a gear 104, which meshes with a pinion 105 loosely mounted upon the jack shaft 23. This pinion has secured thereto one member 106 of a clutch, the other member 107 of which has feathered engagement with the shaft 23, and is provided with the usual grooved collar 108. The other end of the countershaft 100 extends outside the framework 10, and is there provided with a sprocket wheel 109, which is connected by means of a link belt 110 with a sprocket wheel 111 loosely mounted on the outer end of the jack shaft 23. The sprocket wheel 111 has secured thereto one member 112 of a clutch, the other member 113 of which is feathered to the shaft 23 and is provided with the grooved collar 114.

Mounted in bearings 115, 115, extending upwardly from the framework 10 is a sliding shaft 116, which has the forks 117 and 118 extending downwardly therefrom to engage with the grooved collars 108 and 114, respectively. The sliding rod 116 is connected with the actuating lever 119, which is pivoted at 120 in the platform 61, above which it extends within easy reach of the operator. The bottom of this actuating lever 119 may be bifurcated, as is usual in the art in arrangements of this kind, to engage in a grooved collar 121 and to thereby provide for shifting the rod 116 from side to side, as is well understood. It is now apparent that shifting the rod 116 from side to side operates to throw into operative position either the clutch 106, 107 or the clutch 112, 113, and by this operation determines the direction in which the shaft 100 shall rotate. As will hereinafter more fully appear, this shaft determines direction not only as to the operation of the thrusting cable 95, but also as to the locomotion of the machine.

The drum 99 is loosely mounted upon the shaft 100, as is also a sleeve 122, which is provided with a sprocket wheel 123, over which passes a link belt 124 to connect the same with a sprocket 125 mounted upon a shaft 126 near the rear of the frame 10. This sprocket wheel has secured thereto a reducing sprocket 127, which is connected by means of a link belt 128 with a sprocket 129 mounted upon the rear axle 130, at each end of which a locomotion wheel 131 is secured, this axle being suitably mounted in the framework. These locomotion wheels, in the present embodiment, are in the form of wide drums, so that the machine may be well propelled in soft and marshy lands. Also mounted upon the rear axle 130, in about the middle thereof, is a sprocket wheel 132, which is connected by means of a link belt 133 with a sprocket 134 operatively mounted upon the forward axle, as will be hereinafter described.

Returning now to the devices relative to the shaft 100, it will be seen that the sleeve 122, which is loosely mounted on the shaft 100, is in reality a clutch member for coaction with a clutch sleeve 135, which is feathered upon the shaft 100 and which is provided with the usual grooved collar 136. The drum 99 has secured thereto a clutch member 137, which is arranged to coact with a clutch member 138, which is feathered on the shaft 100 and has secured thereto the grooved collar 139. Clutch forks 140 and 141 engage in the grooved collars 136 and 139, respectively, and are connected together by suitable means and with an actuating lever 142, which is pivoted at 143 to the platform framework 61. The lever 142 extends through and above the platform, so that it may be within easy reach of the operator. It will now be seen that actuation of the lever 142 from side to side simultaneously moves the clutch members 135 and 138 and brings into active relation with the shaft 100 either the drum 99 or the sleeve 122. When the drum 99 is brought into active relation with the shaft 100 the thrusting mechanism is operated, and when the sleeve 122 is brought into active relation with the shaft the locomotion mechanism is operated. Previous to bringing either of these devices into active relation with the shaft 100, the actuating lever 119 is operated in order to determine the direction in which the shaft 100 shall rotate.

The thrust beam 33 is restrained by reason of its engagement upon the roller 34 in the yoke 25 and by reason of the quite taut arrangement of the thrusting cable 95, which extends from the beam at one side of the roller to the same at the other side of the roller, the propelling mechanism—that is, the drum 99—intervening. Upon suitable rotation of the drum 99 the cable draws the shaft 33 downwardly or upwardly, in accordance with the direction of the drum. When the drum is rotated in the proper direction the cable will be drawn down and will carry with it the beam at all times, holding it fulcrumed against the roller, thrusting it into the ground with a motion substantially parallel to the spading blade of the shovel itself. By this action a load of earth is spaded and determined, and by the subsequent action of the raising drum 81 the shovel is raised out of the ditch. After the shovel has been swung around, as has been heretofore pointed out, it may be relieved of its burden, and after coming into position over the proposed ditch, the thrusting drum is again operated to draw the shovel back and then reversed to again thrust it into the ground.

Going back to the locomotion of the structure, it will be seen by reference to Figs. 1 and 2, and particularly to Fig. 8, that the sprocket wheel 134, which is connected by means of the link belt 133 with the sprocket 132 on the rear axle, is provided with a square opening, which flares outwardly from a central edge. The front axle 144 is provided with a square portion 145, which engages in the square opening in the sprocket 134. The forward sprocket 134 is held in place conveniently by means of angle-bars 146, 146, which are secured as part of the framework, as clearly shown in Fig. 2. To the under side of the angle-irons 146, 146 an annulus 147 is secured in any suitable manner, and with this annulus a second annulus 148 is associated in the way of a turntable. To the under side of the lower annulus 148, the bearing members 149, 149 are secured, these bearing members being provided with similar grooves to correspond to the curve of the annuli and to engage the sides of both of them as illustrated in Figs. 2 and 8. By this arrangement the front axle is held in place and may swing somewhat to provide for steering the device within reasonable limits. In order that this steering may take place, the square opening in the sprocket 134 is flared, so that the swinging of the forward axle 144 will not in any way interfere with the link belt connection between the sprockets 134 and 133. To steer the device the axle is provided with the grooved sleeves 150, 150, in which engage the rings 151, 151, which are connected by means of rods and connecting chains 152, 152 with a small drum 153, which may be actuated in any suitable manner by means of a handle or steering wheel 154. As shown in Fig. 8, a suitable base 155 may be provided to properly support these operating parts in the steering and propelling arrangement. As a safeguard for the operation of all the parts I provide upon the clutch 106, 107 on the jack shaft 23, which is in the form of a drum, a brake-band 156, which is suitably secured at one end at 157 in the framework and at its other end is connected with a bell crank lever 158, which is mounted in a bearing 159 on the platform 61 and terminates in a foot-piece 160 within reach of the operator. This is designed to brake the movement at any stage should such become desirable.

At the forward end of the swinging beam 31 I provide extensions 161, to the end of which is secured a scraper 162. This scraper is arranged to engage the shovel 62 when it is drawn upwardly, and is effectual in forcing therefrom any material which might adhere thereto.

Although the operation of the various parts has heretofore been described in connection with the description of the specifications of the construction, I will add a brief summary of the actions in the usual operation of my device.

As has been before stated, the device is particularly useful in the digging of a ditch, and it is apparent that it may be propelled intermittently as desired as the ditch is dug, the wide drums of the propelling wheels being useful should the structure be employed in digging marsh lands. While the structure is being brought into place for operation or while it is being propelled into another position the clutch member 135 is in engagement with the clutch member 122. The engine shaft 20 rotates constantly in the direction of the arrow $a$ and causes constant rotation of the jack shaft 23 in the direction of the arrow $b$. By the use of the lever 119, the direction of the countershaft 100 is determined, and while locomotion is taking place the actuation of the lever 142 has brought the clutch member 135 into engagement with the clutch member 122. When the proper position is finally reached, the actuating lever 142 is thrown onto the other side and the clutch member 138 is brought into engagement with the clutch member 137, thus connecting the drum member 99 with the shaft 100. The proper direction is again determined by the course of the actuating lever 119 and the thrust beam 33 is drawn downwardly to thrust the shovel 62 into the earth, as has heretofore been described. After this operation has been completed, the lever 119 is set so that neither clutch 106, 107 nor 112, 113 is in operative position, and no motion is transmitted to the shaft 100. The shovel has now severed its load from the earth and is ready to be raised. The foot-piece 90 is then depressed to throw the clutch 84 into operative position, and the drum shaft 81 is then operated to wind the lifting cable 68. Either after the shovel has been sufficiently raised or while it is being raised, the swinging mechanism is operated by actuating the lever 59. This actuation of the lever 59 throws either the clutch member 52, 53 or 57, 58 into operative condition, depending upon the side where the load is to be deposited. Thus, these two operations may be done simultaneously, if convenient, or the shovel may be swung after it has been raised to a predetermined position. The levers 59 and 119 thus each may assume three positions to determine one direction or the other and to determine either rest or motion. The lever 142 may occupy two positions to connect in operative relation with the shaft 100 either the propelling device or the thrusting device. When the shovel has been raised and properly swung to the side of the ditch, the operator pulls the cord 68 and thereby draws up the power arm of the lever 70 to release the detent arm thereof from the lug 71. The weight of the load then turns the shovel, so that it may be readily dropped therefrom onto the earthworks at the side. The foot-piece 90 is then released to allow the shovel to drop, this drop being retarded by depressing the foot-piece 94 to bring the brake-band 91 into action. This usually takes place after the lever 59 has been reversed to swing the shovel back to its position over the proposed ditch. Then the lever 119 is reversed to operate the drum 99 in the opposite direction to draw the shovel back ready for another strike into the ground. Should it be desired to further propel the vehicle, the lever 142 is operated, thus throwing out the drum 99 and throwing the sprocket sleeve 122 into engagement with the shaft 100. The depth of the strike is determined by the operator, who has charge of the various levers and foot-pieces, and the extent of the other actions may be determined by him. If at any time the action should be retarded or stopped, such being often the case in swinging the shovel, the foot-piece 160 is operated to brake the jack shaft.

It is seen that the thrust of the beam 33 is substantially in the direction of the spading blade of the shovel, and it is apparent that this primary action in reality cuts a load from the earth and does nothing else. The subsequent operations transfer this load *in toto* out of the ditch and to the side thereof, at the will of the operator.

I claim as new and desire to secure by Letters Patent:

1. In an excavating machine, in combination, a supporting framework, a shovel movably mounted thereon, means for imparting a longitudinal thrust to said shovel, means for raising said shovel, means for positively locking said shovel in position to retain its load, means for tripping said locking means to tip said shovel forwardly to discharge its load from the front thereof, and a scraper carried by said framework and arranged in position to be engaged by any material carried by the shovel when the same is tipped.

2. In an excavating machine, in combination, a jack shaft, an engine for rotating said jack shaft constantly in one direction, a counter shaft, means for operating said counter shaft from said jack shaft in either direction, a drum mounted on said counter shaft, a thrust beam, a shovel carried by said beam, a cable wound upon said drum and connected with said thrust beam to operate same in either direction, a second counter shaft operatively connected with said jack shaft, a reel upon said second counter shaft, a cable extending from said reel to said shovel, means for rotating said reel in one direction to raise said shovel, and means for releasing said reel to permit the lowering of said shovel.

3. In an excavating machine, in combination, a jack shaft, an engine for rotating said jack shaft constantly in one direction, a counter shaft, means for reversing the direction of said counter shaft, a drum on said counter shaft, a beam, a shovel mounted on said beam, a cable having its ends connected toward the respective ends of said beam and being wound in part on said drum, a swinging frame in which said beam is mounted, a second counter shaft connected with said jack shaft, means for operatively connecting said second counter shaft with said swinging frame, a third counter shaft, a reel on said third counter shaft, and a cable connecting said reel with said shovel to raise the same.

4. In an excavating machine, a vehicle, a swinging boom carried thereby, a thrusting beam mounted on a fulcrum in said boom, a shovel on said beam, a jack shaft, an engine for driving said jack shaft, a counter shaft driven from said jack shaft in either direction, a winding drum associated with said counter shaft, a cable wound upon said drum and having its ends attached near the respective ends of said beam, a second counter shaft driven from said jack shaft in one direction and free in the other, a winding drum on said second counter shaft, a cable on said second named winding drum, said cable passing over a bearing point in said boom and being attached to the end of said beam, a gear segment on said boom, a worm meshing with said segment, a third counter shaft, and connection between said third counter shaft and said worm whereby the latter may be operated in either direction.

5. In an excavating machine, in combination, a supporting framework, a shovel movably mounted thereon, means for raising said shovel, means for positively locking said shovel in position to retain its load, means for tripping said locking means to tip said shovel forwardly to discharge its load from the front thereof, and a scraper carried by said framework and arranged in position to be engaged by any material carried by the shovel when the same is tipped and raised.

6. In an excavating machine, in combination, a jack shaft, an engine for rotating said jack shaft constantly in one direction, a counter shaft, a pinion on said jack shaft, a gear on said counter shaft meshing with said pinion, a pulley on said counter shaft, a pulley on said jack shaft, a belt connecting said pulleys, clutch mechanism for operatively connecting said jack shaft with either the pulley or the pinion thereon, a drum mounted on said counter shaft, a thrust beam, a shovel carried by said thrust beam, a cable wound upon said drum and connected with said thrust beam to operate same in either direction, a second counter shaft operatively connected with said jack shaft, a reel upon said second counter shaft, a cable extending from said reel to said shovel, means for rotating said reel in one direction to raise said shovel, and means for releasing said reel to permit the lowering of said shovel.

7. In an excavating machine, in combination, a jack shaft, an engine for rotating said jack shaft constantly in one direction, a counter shaft, means for reversing the direction of said counter shaft, a drum on said counter shaft, a thrust beam, a shovel mounted on said thrust beam, a cable having its ends connected toward the respective ends of said thrust beam and being wound in part on said drum, a second counter shaft connected with said jack shaft, means for operatively connecting said second counter shaft with said swinging frame, a third counter shaft, a reel on said third counter shaft, a cable connecting said reel with said shovel to raise the same, and means for braking said third counter shaft.

8. In an excavating machine, in combination, a jack shaft, an engine for rotating said jack shaft constantly in one direction, a counter shaft, means for reversing the direction of said counter shaft, a drum on said counter shaft, a thrust beam, a shovel mounted on said thrust beam, a cable having its ends connected toward the respective ends of said thrust beam and being wound in part on said drum, a second counter shaft connected with said jack shaft, means for operatively connecting said second counter shaft with said swinging frame, a third counter shaft, a reel on said third counter shaft, a cable connecting said reel with said shovel to raise the same, means for braking said third counter shaft, and a brake for said jack shaft.

In witness whereof I hereunto subscribe my name this 18th day of September, A. D. 1909.

OTTO W. SIEBENHAAR.

Witnesses:
  WALDO SWEET,
  GRACE STODDART.